(12) United States Patent  
Bilgen et al.

(10) Patent No.: US 9,330,379 B2  
(45) Date of Patent: May 3, 2016

(54) PROVIDING NOTIFICATIONS OF MESSAGES FOR CONSUMPTION

(75) Inventors: Aras Bilgen, Hillsboro, OR (US); Dirk Hohndel, Portland, OR (US); Shruti Kapur, London (GB); Giorgio Venturi, London (GB)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 13/619,943

(22) Filed: Sep. 14, 2012

(65) Prior Publication Data

US 2014/0082094 A1    Mar. 20, 2014

(51) Int. Cl.
*G06Q 50/00* (2012.01)
*G06Q 10/10* (2012.01)

(52) U.S. Cl.
CPC .............. *G06Q 10/107* (2013.01); *G06Q 50/01* (2013.01)

(58) Field of Classification Search
CPC ...................................... G06Q 50/01
USPC ......................................... 709/206
See application file for complete search history.

(56) References Cited

U.S. PATENT DOCUMENTS

| 6,146,027 | A | 11/2000 | Orton et al. |
| 6,351,656 | B1 | 2/2002 | Burgan et al. |
| 8,589,495 | B1 * | 11/2013 | Beckert ........................ 709/206 |
| 2003/0046421 | A1 * | 3/2003 | Horvitz et al. ................ 709/238 |
| 2003/0065790 | A1 * | 4/2003 | Loveland et al. ............. 709/228 |
| 2004/0098462 | A1 | 5/2004 | Horvitz et al. |
| 2004/0259536 | A1 | 12/2004 | Keskar et al. |
| 2007/0197195 | A1 * | 8/2007 | Sugiyama et al. .......... 455/412.2 |
| 2010/0138858 | A1 * | 6/2010 | Velazquez et al. .............. 725/33 |
| 2012/0124475 | A1 * | 5/2012 | Foote et al. .................... 715/719 |

FOREIGN PATENT DOCUMENTS

JP        207082228 A        3/2007

OTHER PUBLICATIONS

Horvitz, Eric, "Principles of Mixed-Initiative User Interfaces", Microsoft Research, 8 pages, Redmond, WA.
McCrickard et al., "Evaluating Animation in the Periphery as a Mechanism for Maintaining Awareness", 8 pages.
Whittaker et al., "Let's stop pushing the envelope and start addressing it: a reference task agenda for HCI", 27 pages.
McCrickard, Scott D., "Maintaining Information Awareness with Irwin", College of Computing and GVU Center, Georgia Institute of Technology, 7 pages, Atlanta, GA.

(Continued)

*Primary Examiner* — Suraj Joshi
(74) *Attorney, Agent, or Firm* — Schwabe, Williamson & Wyatt, P.C.

(57) ABSTRACT

Embodiments of apparatus, packages, computer-implemented methods, systems, devices, and computer-readable media (transitory and non-transitory) are described herein for providing a notification of a message to a recipient for consumption using a computing device. In various embodiments, provision of the notification may be in a timing or manner that is based on a characteristic of the message, an operational context of the system, and/or empirical data about preferred timing or manner of notification of at least another message to the same or different recipient. In various embodiments, the at least another message may share the same characteristic, or may have a related characteristic.

25 Claims, 3 Drawing Sheets

(56) References Cited

OTHER PUBLICATIONS

Norman, Donald A., "Cognitivie Engineering", User Center System, 1986, 16 pages.
Dantzich et al., "Scope: Providing Awareness of Multiple Notifications at a Glance", Microsoft Research, 11 pages, Redmond, WA.
Maglio et al., "Suitor: An Attentive Information System", IBM Almaden Research Center, 8 pages, San Jose, CA.
Maglio et al., "Tradeoffs in Displaying Peripheral Information", IBM Almaden Research Center, 8 pages, San Jose, CA.
Vertegaal et al., "Catching the Eye: Management of Joint Attention in Cooperative Work", SIGCHI Bulletin (29)4. ACM SIGCHI, 1997, 9 pages.
McCrickard et al., "Attuning Notification Design to User Goals and Attention Costs", Communications of the ACM, Mar. 2003, vol. 46. No. 3, pp. 67-72.
International Search Report and Written Opinion mailed Dec. 16, 2013 for International Application No. PCT/US2013/057353, 17 pages.
International Preliminary Report on Patentability mailed Mar. 26, 2015 for International Application No. PCT/US2013/057353, 10 pages.

* cited by examiner

PROVIDING NOTIFICATIONS OF MESSAGES FOR CONSUMPTION

FIELD

Embodiments of the present invention relate generally to the technical field of data processing, and more particularly, to providing notifications of messages for consumption.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A computing device such as a desktop or laptop computer, a tablet computer, a mobile phone, or any other device that processes data may receive messages pushed or pulled from various sources. The computing device may also generate its own internal messages, such as when battery power is low. A user of the computing device may be notified of these messages in various ways, e.g., in a manner meant to avoid overly distracting the user from the task at hand. For example, a notification of receipt of an incoming email may be temporarily displayed at a periphery of a computer screen, or on a locked screen of a mobile phone, and then may fade away. As another example, an incoming message such as a stock quotation or weather report may be displayed via a "widget" persistently rendered on the periphery or on a locked screen. When multiple messages are received and/or generated, a user may be overwhelmed with notifications. The user could miss a critical message when its corresponding notification is lost among other notifications of less critical messages. Moreover, a constant stream of notifications may distract the user from the task at hand, which in some scenarios, such as where a user is operating a vehicle, could prove hazardous to the user or others.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
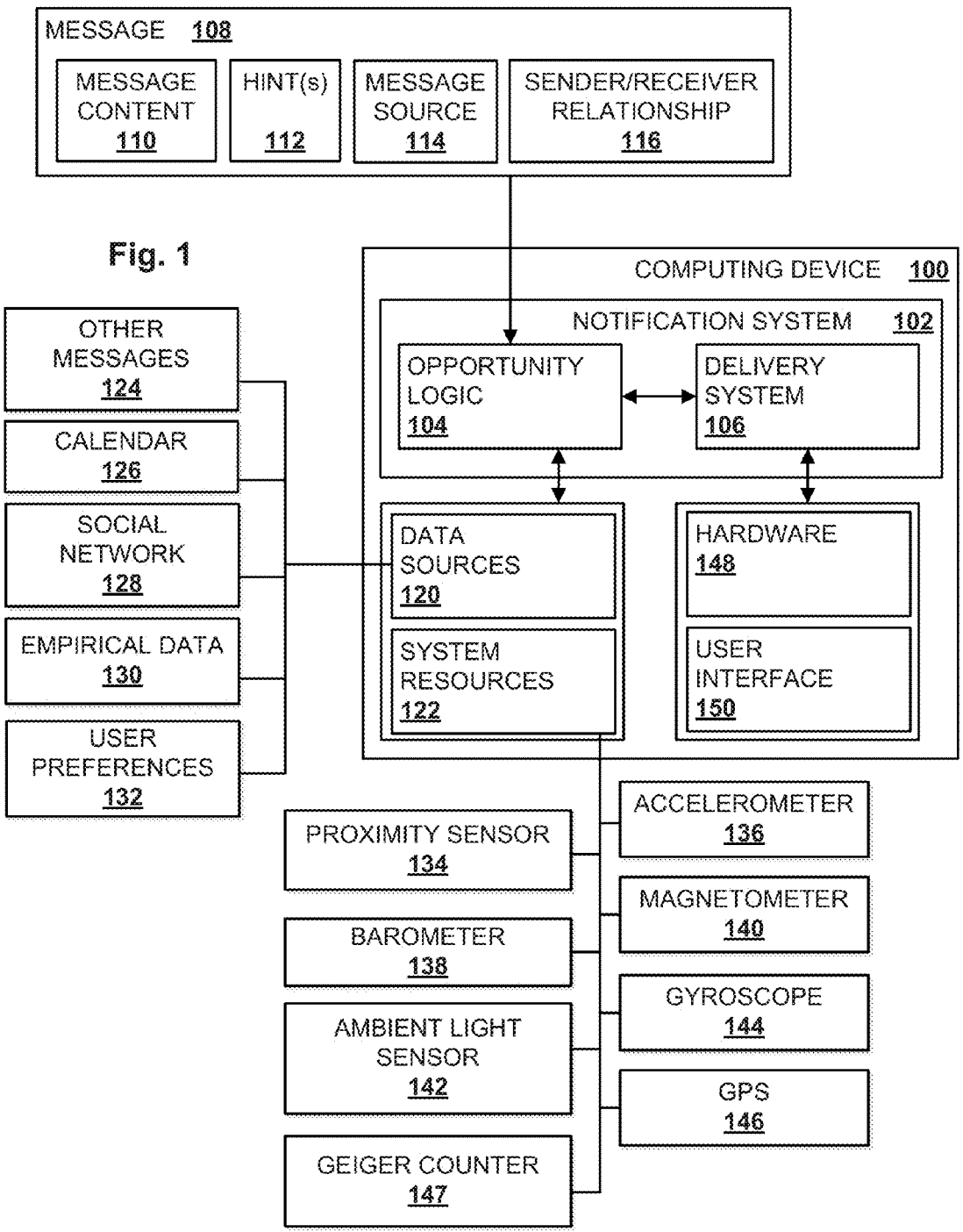
FIG. 1 schematically illustrates example components that may be implemented on and/or utilized by a computing device to provide notifications of messages for consumption, in accordance with various embodiments.

Referring now to FIG. 1, an example computing device 100 may be configured to implement all or selected portions of the teachings of the present disclosure. In various embodiments, computing device 100 may include a notification system 102 that may include opportunity logic 104 and a delivery system 106. Using these components, computing device 100 may be configured to provide notification of a message 108 for consumption by a recipient (not shown) using computing device 100. In various embodiments, the provision of notification may be in a timing or manner that is based on various information.

Opportunity logic 104 may, in various embodiments, act as a primary decision maker for determining a timing and/or manner in which notification of message 108 is provided for consumption. As will be discussed below, opportunity logic 104 may provide, to delivery system 106, a directive, and delivery system 106 may utilize various hardware and/or software components to provide the notification in accordance with the directive. In other embodiments, a single logic may perform all tasks of notification system 102. In various embodiments, opportunity logic 104 and/or delivery system 106 may be modified from an initial configuration, e.g., by vendors, authorities and/or users. In various embodiments, opportunity logic 104 and/or delivery system 106 may additionally or alternatively be configured at run time, e.g., by data dynamically pulled from trusted sources.

In various embodiments, message 108 may be a received or incoming message that was pushed to computing device 100 from an outside source or pulled from an outside source by computing device 100. Message 108 may also be a message generated internally by computing device 100 (e.g., "battery low," "fifteen miles until out of gas").

To determine a timing or manner of provision of a notification of message 108 to the recipient, opportunity logic 104 may consider one or more characteristics of message 108. FIG. 1 depicts examples of message characteristics that may be considered by opportunity logic 104. These include but are not limited to message content 110, one or more non-deterministic hints 112 included in or associated with message 108, a source of message 114, and a sender/receiver relationship 116. Although shown as blocks inside of message 108, this is not meant to suggest that each of these characteristics has been explicitly inserted into message 108, although that is possible, particularly in the case of the one or more non-deterministic hints 112. In at least some instances, a characteristic of message 108 may be determined based on other information, such as other characteristics of message 108 and/or other data.

Message content 110 may include any data contained in message 108. This may include but is not limited to text (e.g., a stock price quote, a score of a sporting event, traffic information, television channel update, information about a security violation, a low gasoline level warning, weather report, etc.), media for consumption (e.g., audio, video, digital photo, etc.), and so forth. Message content 110 may be in a body of message 108, or it may accompany message 108, e.g., as an email attachment.

One or more non-deterministic hints 112 may serve as a suggestion as to the timing or manner in which notification of message 108 should be provided for consumption using computing device 100. In various embodiments, non-deterministic hint 112 may be deliberately incorporated into or otherwise associated with message 108, e.g., by a sender or another entity. Non-deterministic hint 112 may include but is not limited to information about an activity to which the message relates (e.g., driving), a particular media content (e.g., a television show, movie, etc.) to which the message relates, a nature of message content 110 (e.g., stock-related, traffic information, security warning, weather report, television channel update, etc.), and so forth. In various embodiments, the hint may additionally or alternatively contain an explicit suggestion as to a timing or manner in which a notification of message 108 should be provided for consumption. For instance, the hint may include a suggested timing of notification presentation, e.g., immediately, after a predetermined delay, on occurrence of a future event (e.g., adjournment of a meeting, end of a telephone call, vehicle comes to a stop, etc.), when the recipient is not busy. The hint may additionally or alternatively include a suggested format (e.g., display then fade, ticker), and/or any suggested accompanying audio, visual or tactile stimuli (e.g., vibration, beeps, etc.).

Message source 114 may be a sender of message 108, an entity, group or organization on behalf of which message 108 was sent, a physical location from which message 108 was sent, a computer server that transmitted message 108, and so forth. For example, if message 108 is from a "friend" through a social networking service, message source 114 may be an identity of the friend, an identity of the social network service itself, a location of the friend when the friend sent the message, a location of the physical server that sent the message, and so forth.

Sender/receiver relationship 116 may indicate a relationship between a sender of message 108 and the recipient. In some embodiments, rather than being explicitly stated in message 108, sender/receiver relationship 116 may be determined from other information. For example, in some embodiments, sender/receiver relationship 116 may be determined based at least in part on message source 114. If a message to recipient Jim Stephens is from his wife, Jane Stephens, then sender/receiver relationship may be "spouse" (or "wife" from Jim's perspective).

In addition to message 108, in various embodiments, other sources of information may be used by opportunity logic 104 to determining a timing or manner of provision of notification of message 108. These may include but are not limited to data sources 120 and/or system resources 122.

In various embodiments, data sources 120 may include but are not limited to other messages 124, a calendar 126 (e.g., associated with the recipient of message 108), a social network 128 (e.g., used by the recipient of message 108), empirical data 130, user preferences 132, and so forth. One or more of these data sources may be used, e.g., in combination with one or more characteristics of message 108, to determine a timing or manner in which notification of message 108 is provided to the recipient for consumption. While shown as blocks outside of computing device 100, this is not meant to be limiting. Data sources 120 may be contained in memory (not shown) of computing device 100, in memory of one or more remote computing devices (not shown), or in any combination thereof.

Other messages 124 may include messages besides message 108 (e.g., received from an outside source or generated internally by computing device 100) of which the recipient is to be provided notification. In various embodiments, the timing of provision of notification of message 108 may be defined relative to a timing of provision of notification of other messages 124. For instance, notification of message 108 may be queued so that it is provided to the recipient of message 108 for consumption in a timing or manner defined relative to provision of notification of other messages 124, such as before (e.g., if message 108 is deemed likely to be more important to the recipient than other messages 124), after, above, below, in front of, behind, larger than, smaller than, more conspicuous than, less conspicuous than, etc.

Calendar 126 may come in various forms, from one or more sources. In some embodiments, calendar 126 may be associated with social network 128. In some embodiments, calendar 126 may be associated with a recipient's personal and/or workplace email account, a general workplace calendar, or a calendar associated with another online entity. Calendar 126 may include appointments and other information usable to determine an appropriate timing or manner in which notification of message 108 should be provided to the recipient. For instance, if calendar 126 reveals that the recipient of message 108 is in a meeting, various actions may be taken. Provision of notification of message 108 may be delayed until after the meeting. The notification may remain active (e.g., visible) until recipient interacts with it, e.g., to insure the recipient is made aware of message 108. Or, the message notification may be rendered and fade, but then repeated later until acknowledgement from the recipient is received.

Social network 128 may be one or more forms of social networks, including personal, professional, trade-oriented, and so forth. Social network 128 may include a wide variety of information relating to the recipient of message 108 and/or others associated with or related with recipient. This may include but is not limited to demographic data (e.g., age, gender, residence, citizenship, occupation, etc.) about the recipient, identities of and demographic information about others associated with the recipient (e.g., friends, relatives, co-workers, etc.), information about the recipient's interests, habits, hobbies and travel patterns, information about interests of others in a similar demographic as the recipient, the recipient's membership in one or more organizations or groups, relationships and/or interactions between the recipient and others, and so forth.

Empirical data 130 may include data about preferred timing or manner of notification at least another message to the same or different recipient. In various embodiments, the at least another message may share a characteristic with message 108, or may have a related characteristic.

As an example, assume message source 114 is the recipient's spouse. Empirical data 130 may, upon analysis by opportunity logic 104, reveal that the recipient has very promptly consumed notifications for past messages from the recipient's spouse. In such case, opportunity logic 104 may direct delivery system 106 to provide notification of message 108 immediately, or as soon as is practicable (assuming the recipient is, e.g., driving or on the phone).

As another example, assume message content 110 is a local weather report. Empirical data 130 may, upon analysis by opportunity logic 104, reveal that the recipient has consumed notifications for past weather-related messages somewhat promptly, but not as promptly as, e.g., messages from the recipient's spouse. In such case, opportunity logic 104 may direct delivery system 106 to provide notification of message 108 only as soon as it appears the recipient will not be otherwise engaged. For example, delivery system 106 may delay provision of notification until the recipient is not performing any tasks using computing device 100, or is performing a leisurely task such as playing a game.

As yet another example, assume non-deterministic hint 112 states that message is "vehicle operation-related," and that computing device 100 is an onboard navigation/stereo system of a vehicle currently being operated by the recipient of message 108. Assume also that another message (not shown) has arrived at computing device 100, and the another message is designated (e.g., via a non-deterministic hint contained therein) as "traffic-related." Empirical data 130 may, upon analysis by opportunity logic 104, reveal that the recipient has consumed notifications for past vehicle operation-related messages more promptly than past traffic-related messages. In such case, opportunity logic 104 may direct delivery system 106 to provide notification of vehicle operation-related message 108 in a manner that encourages the recipient to consume it first, before the recipient consumes notification of the traffic-related message. For example, delivery system 106 may provide notification of the vehicle operation-related message in front of, above, before, or otherwise more conspicuously than notification of the traffic-related message.

User preferences 132 may include data explicitly provided by the recipient. For example, the recipient may operate a user interface on computing device 100 or elsewhere to indicate the timing or manner in which the recipient prefers to be notified of various types of messages. User preferences 132 may be used alone or in conjunction with other data (e.g., empirical data 130), e.g., by opportunity logic 104, to analyze how the user prefers to consume notifications of various types of messages. Opportunity logic 104 may then use this data to "guess" how the recipient will most likely prefer to consume notifications of new, similar messages.

In addition to message 108 and data sources 120, opportunity logic 104 may also determining a timing or manner of provision of notification of message 108 based on system resources 122 of computing device. In various embodiments, system resources 122 may include but is not limited to sensors connected to or in communication with computing device 100. These sensors may include but are not limited to a proximity sensor 134, an accelerometer 136, a barometer 138, a magnetometer 140, an ambient light sensor 142, a gyroscope 144, a global positioning system ("GPS") 146, a Geiger counter 147, and so forth. These sensors may provide information that may be usable, alone or in combination with other information described herein, to determine an operational context of computing device 100.

Assume, for example, computing device 100 is in a vehicle, and data from GPS 146 and/or accelerometer 136 reveals that computing device 100 is located at a particular location and headed north. If message content 110 relates to a traffic incident that is south of the location, and thus, behind computing device 100, opportunity logic 104 may determine that message 108 has a very low priority. Opportunity logic 104 may even determine that message 108 is not worth of notification at all. But, if calendar 126 reveals that the recipient will later be travelling south to an appointment near or otherwise potentially affected by the traffic incident, opportunity logic 104 may direct delivery system 106 to provide the notification for consumption in a non-distracting manner, or at least to delay provision of the notification until a time that is closer to that appointment.

In various embodiments, delivery system 106 may act as a "broker" that collaborates with opportunity logic to provide notification of message 108 for consumption in a timing or manner determined based at least in part on information provided by opportunity logic 104. Delivery system 106 may be coupled with hardware 148 of computing device 100 (e.g., a display, a light emitting diode, battery testing circuitry, a speaker, etc.) and/or a user interface logic 150.

In some embodiments, a directive provided by opportunity logic 104 to delivery system 106 may be "simple," and may simply direct delivery system 106 as to how notification of message 108 is to be provided for consumption. For example, opportunity logic 104 may instruct delivery system to deliver a message immediately. In various other embodiments, however, opportunity logic 104 may provide a more complex (although in some cases, still deterministic) directive that may be processed by delivery system 106. Within this directive, delivery system 106 may have some discretion as to how to provide the notification, dependent on various information (e.g., information from system resources 122).

For example, computing device 100 may be a tablet computer in the driver's possession, or an onboard navigation computing device integral with the vehicle. Based on data from system resources 122 such as accelerometer 136 and/or GPS 146, opportunity logic 104 may determine that, at a time when message 108 is received at computing device 100, the vehicle is currently moving. Based on one or more characteristics of message 108, such as message content 110 and/or an associated non-deterministic hint 112, opportunity logic 104 may determine that message 108 is not related to driving. To avoid distracting the recipient while driving with messages that are not critical to the task at hand, opportunity logic 104 may provide delivery system 106 with a directive to provide the recipient with notification of message 108 for consumption at a more suitable time. Delivery system 106 may then determine, e.g., using one or more system resources 122 and/or data sources 120, a suitable time to provide the recipient with notification of message 108 for consumption. For example, delivery system 106 may provide notification when the vehicle is at a stop light or after it is parked. In some embodiments, opportunity logic 104 and/or delivery system 106 may calculate, e.g., using GPS 146 and/or accelerometer 136, the coordinates of the next traffic signal that will be reached by the vehicle, and/or an estimated time at which the traffic signal will be reached. In some embodiments, notification may be provided, e.g., by delivery system 106, to the recipient for consumption only when the traffic signal will be red for more than a predetermined amount of time (indicating the vehicle should be stopped for long enough for the recipient to have adequate time to consume the notification).

In some embodiments, computing device 100 (e.g., via opportunity logic 104) may be configured to identify other computing devices associated with the recipient of message 108. This is not limited to other computing devices possessed or used by the recipient, but also may include computing devices (e.g., mobile phones, tablet computers, etc.) possessed or used by people associated with the recipient. Opportunity logic 104 and/or delivery system 106 may redirect message 108 and/or notification of message 108 to one or more of those computing devices, instead of or in addition to computing device 100, if those devices happen to be nearby.

For example, opportunity logic 104 may utilize one or more data sources 120 such as social network 128 to determine that the recipient has a spouse. Opportunity logic 104 may then identify another computing device (not shown) that belongs to the recipient's spouse, e.g., using various resources such as data sources 120 or user preferences 132 (which may explicitly identify family members' computing devices). Using various techniques, such as direct communication (e.g., Wi-Fi Direct, Bluetooth), indirect communication, or any combination of the two, opportunity logic 104 may determine whether the spouse's computing device is proximate to computing device 100, as would be the case for instance if the spouse was riding in the vehicle with the recipient. Upon determining that the spouse's device is proximate, opportunity logic 104 (or delivery system 106 at the request of opportunity logic 104) may attempt to cause a notification of message 108 to be provided for consumption using the spouse's computing device. In some cases, computing device 100 may even redirect message 108 to the spouse's computing device. Of course, the spouse's computing device may itself be configured with applicable teachings of the present disclosure. In such case, the spouse's computing device may perform its own analysis to determine the timing and manner in which the spouse should be provided with notification of message 108 for consumption using the spouse's computing device.

The examples described above are merely illustrative, and it should be understood that the teachings described herein may be applicable in a wide variety of circumstances. As another example, assume a user is consuming media in the form of the user's favorite television show on a computing device (configured with applicable teachings or the present disclosure) in the form of a television, or a computing device such as a digital video recorder or gaming console coupled with the television. Assume also that the television (or coupled computing device) is configured to receive and provide notification of receipt of incoming messages. For example, in some cases, the television (or coupled computing device) may be configured to receive "Tweets" provided by Twitter, Inc. of San Francisco, Calif. (although any other type of message is certainly possible).

Upon receipt of an incoming Tweet, opportunity logic (e.g., 104) associated with the television (or the coupled computing device) may analyze one or more characteristics of the Tweet to determine, e.g., whether the Tweet contains subject matter that has a higher priority to the user than the television show, whether the Tweet is related or otherwise relevant to the television show, or even whether the Tweet is similar to past Tweets that the user opted to consume while consuming the media content. If the Tweet has a higher priority, is relevant to the show or is of a type that the user will likely consume during the show, the opportunity logic may instruct a delivery system (e.g., 106) of the television (or the coupled computing system) to immediately provide visual notification of the Tweet, e.g., superimposed over a portion of the television show. Otherwise, the opportunity logic may direct the delivery system to wait until occurrence of a future event, such as a commercial break, to provide to the user notification of the Tweet for consumption using the television. Or, as described above, the opportunity logic may identify one or more other nearby computing devices associated with the user or with people associated with the user, and attempt to provide notification of the Tweet on those devices.

In various embodiments, the timing or manner of notification of other messages may be altered depending on the timing or manner of provision of notification of a particular message. For instance, assume that on computing device 100, notification of several non-critical messages are displayed at once. However, before a user has a chance to consume these notifications, a critical message (e.g., "battery low") is generated by computing device 100. Rather than simply provide the notification of the critical message among the notifications of the non-critical messages, opportunity logic 104 may cause notification of the critical message to be provided for consumption in a different manner, e.g., requiring interaction from the user. To prevent the notifications of the other, non-critical messages from being missed (e.g., because they may fade away after time), those notifications may be "frozen," such that they remain displayed until after the user addresses the notification of the critical message, or are redisplayed thereafter. Put another way, when the critical message arrives, another notification of another message may remain provided until after the recipient interacts with the notification of the critical message. In some embodiments, the notification of the another message may be provided again after the recipient interacts with the notification of the critical message.

Figure 2:
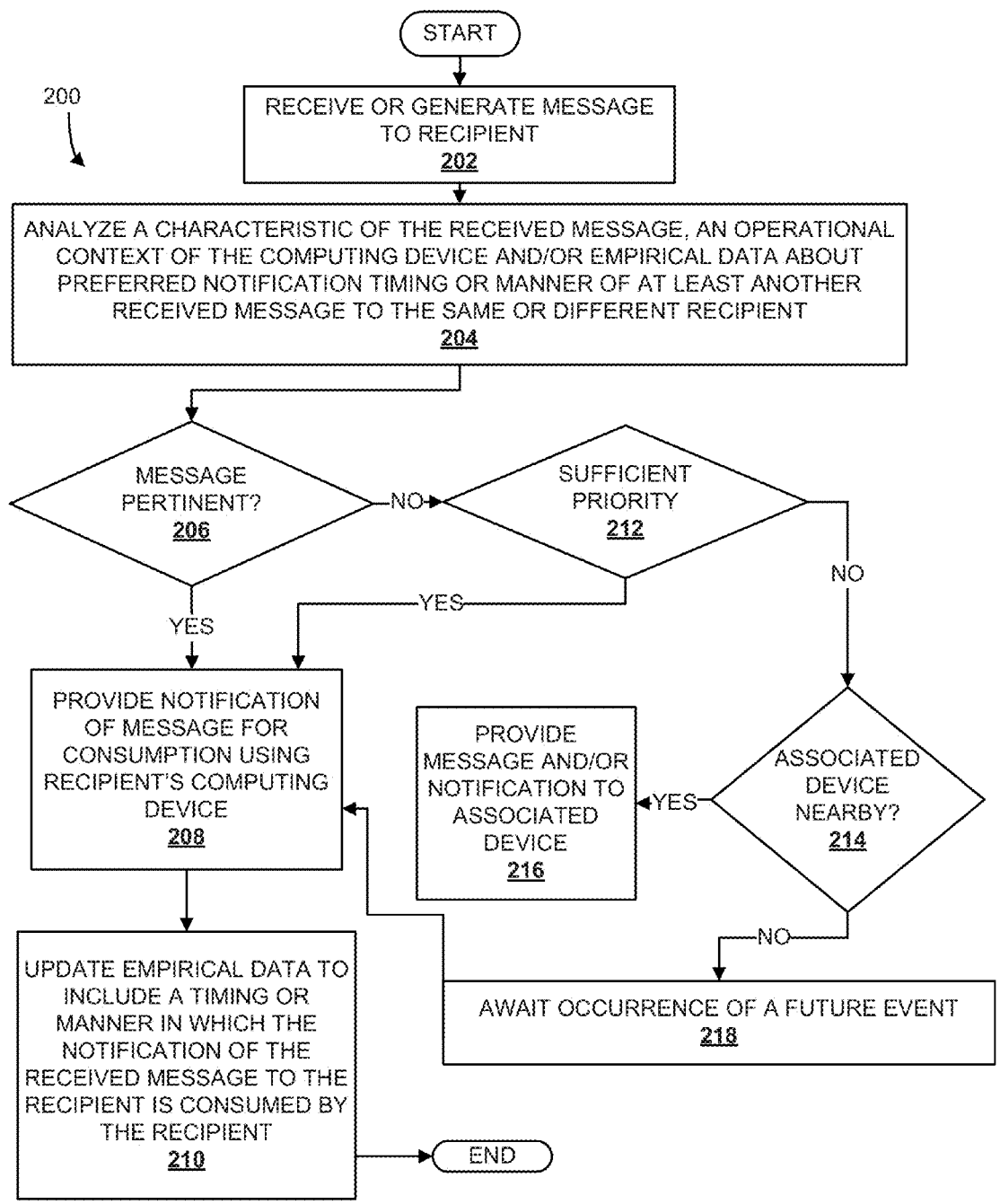
FIG. 2 schematically illustrates an example method for providing notifications of messages for consumption in a particular timing or manner, in accordance with various embodiments.

FIG. 2 depicts an example method 200 that may be implemented by computing devices such as computing device 100 of FIG. 1. While shown in a particular order, these operations are not meant to be limiting, and one or more operations may be reordered, added, or omitted. Moreover, while decision blocks such as 206 and 212 are depicted as "yes/no" decisions, it should be understood that in various embodiments, messages may be characterized along a gradient, with the timing or manner of provision of notification of the message being based on where on the gradient the message lies.

At block 202, a message to a recipient may be received or generated, e.g., by computing device 100. The message may be any sort of communication directed to the recipient, including but not limited to a news update, a Tweet, an email, a simple messaging service ("SMS") text, a multimedia messaging service ("MMS") message, a system message, and so forth.

At block 204, various information may be analyzed to determine timing or manner in which a notification of the message should be provided for consumption. For example, opportunity logic 104 of computing device 100 may analyze a characteristic of the message, which as described above could include a content of the message, a non-deterministic hint, a sender, and so forth.

Opportunity logic 104 may additionally or alternatively analyze an operational context of computing device 100. For instance, based on information from various data sources (e.g., 120 in FIG. 1) and/or system resources (e.g., 122 in FIG. 1), opportunity logic 104 may identify a operational context of computing device 100 and/or recipient, such as whether the recipient currently operates a vehicle, or a media content currently consumed using the computing device.

Opportunity logic 104 may additionally or alternatively analyze empirical data (e.g., 130 in FIG. 1) about preferred timing or manner of notification of at least another message to the same or different recipient. In various embodiments, the at least another message may share the same characteristic or have a related characteristic. For example, opportunity logic 104 may analyze how the recipient has consumed notifications of past messages from the same sender, to determine how and when the recipient likely would wish to be notified of the current message. Opportunity logic 104 may also analyze empirical data to determine how similar or different messages were consumed under a similar operational context. For example, empirical data 130 may, upon analysis by opportunity logic 104, reveal that the recipient prefers to receive notification of messages audibly while driving.

At block 206, it may be determined, e.g., by opportunity logic 104, whether the message is pertinent to a current activity of the recipient/computing device 100. For instance, a message related to driving may be pertinent where the operational context of the computing device is being located in a moving vehicle operated by the recipient. As another example, a message related to a particular media content (e.g., a television show) may be pertinent where computing device 100 is being used to consume the media content.

If the message is deemed pertinent, then at block 208, a notification of the message may be provided, e.g., by delivery system 106 of computing device 100, to a recipient for consumption using computing device 100. In various embodiments, the notification may be provided in a timing or manner based on a result of the analysis of block 204. For instance, a notification of a particularly urgent message (e.g., antilock brake failure) may be provided in a particularly conspicuous manner (e.g., accompanied by a loud noise) and/or may be presented in a manner that requires user interaction. At block 210, empirical data (e.g., 130 in FIG. 1) may be updated, e.g., by computing device 100, to include a timing or manner in which the notification of the message to the recipient was consumed.

If the message is not deemed pertinent to an operational context of computing device 100 at block 206, then at block 212, it may be determined, e.g., by opportunity logic 104, whether the message has a sufficient priority (e.g., greater priority than media content currently being consumed using computing device 100) to warrant immediate notification. This determination of priority may be made, e.g., using empirical data (e.g., 130) to determine whether the recipient has consumed notifications of similar messages contemporaneously with receipt, or has ignored them or consumed them at a later time, e.g., after occurrence of a particular future event. In some embodiments, particularly urgent messages (e.g., antilock brake failure) may intrinsically have a high priority that ensures immediate notification. If the message's priority is sufficient, then method 200 may proceed to block 208, and notification of the message may be provided in a manner commensurate to, e.g., its urgency.

However, if the answer at block 212 is no, then at block 214, it may be determined, e.g., by computing device 100, whether another associated computing device, e.g., belonging to the recipient or to someone associated with the recipient (e.g., the recipient's spouse), is proximate. For instance, computing device 100 may broadcast, e.g., via Bluetooth or Wi-Fi Direct, a message that may be received by nearby computing devices. If any responding computing devices are determined to be associated with the recipient or computing device 100 (e.g., belong to the recipient's spouse as may be determined using data sources like social network 128), then at block 216, the message and/or a notification of the message may be provided to the nearby associated device, so that the notification may be consumed using the nearby associated computing device. As noted above, the nearby associated computing device may itself be configured with applicable teachings of the present disclosure, and therefore may provide notification of the message for consumption in a timing or manner based on its own analysis.

If there are no nearby associated computing devices on which to provide notification of the message for consumption, at block 218, an occurrence of one or more future events may be awaited, e.g., by delivery system 106 of computing device 100. For instance, if the recipient is currently driving (and the message was not deemed worthy of immediate notification), then the future event may be the vehicle operated by the recipient coming to a stop. Or, if computing device 100 is currently being used to consume a particular media content, the future event may be a commercial break. Upon occurrence of the future event, method 200 may proceed to block 208.

Figure 3:
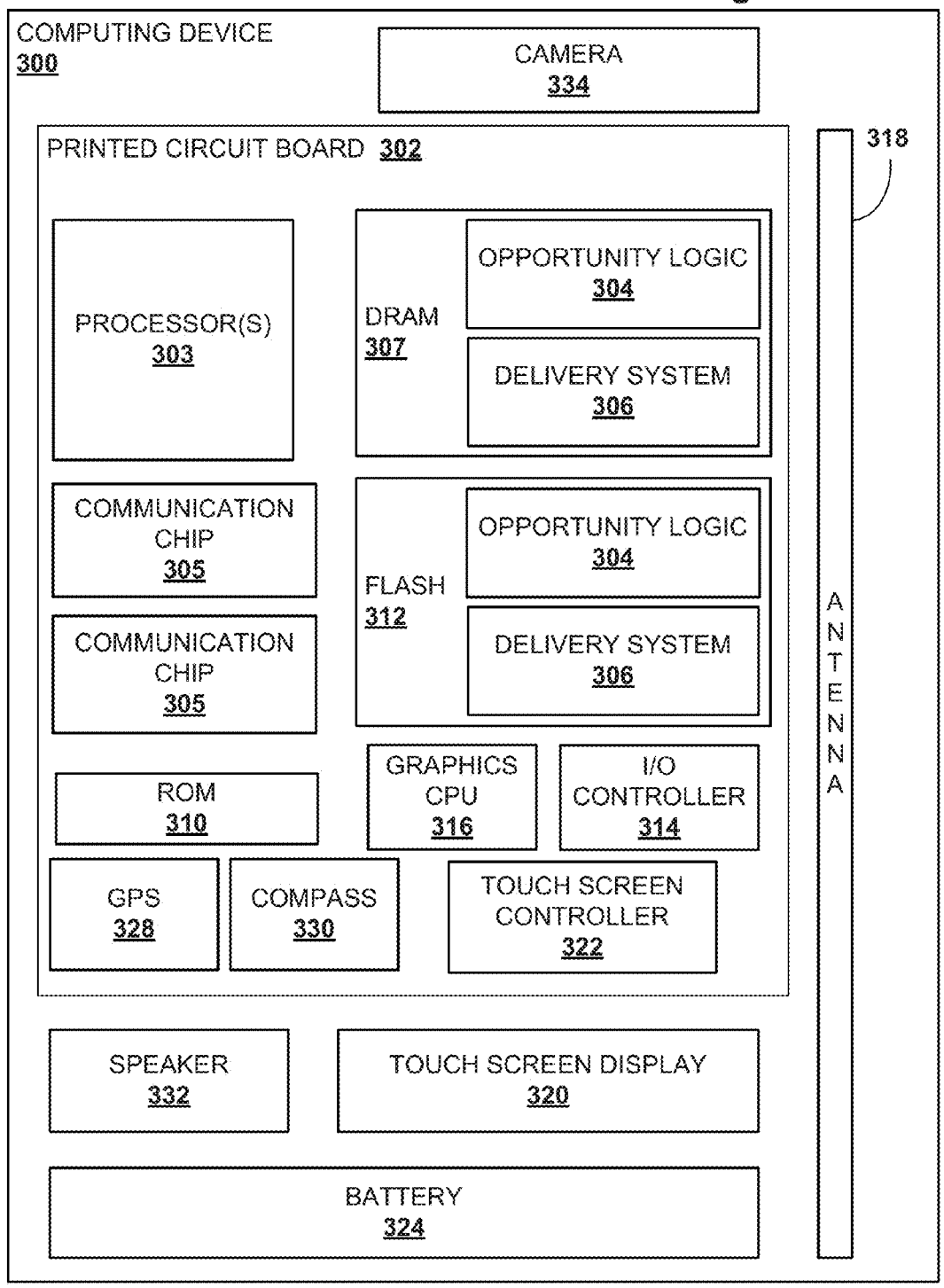
FIG. 3 schematically depicts an example computing device on which disclosed methods and computer-readable media may be implemented, in accordance with various embodiments.

FIG. 3 illustrates an example computing device 300, in accordance with various embodiments. Computing device 300 may include a number of components, one or more processor(s) 303 and at least one communication chip 305. In various embodiments, the processor 303 may be a processor core. In various embodiments, the at least one communication chip 305 may also be physically and electrically coupled to the processor 303. In further implementations, the communication chip 305 may be part of the processor 303. In various embodiments, computing device 300 may include PCB 302. For these embodiments, processor 303 and communication chip 305 may be disposed thereon. In alternate embodiments, the various components may be coupled without the employment of PCB 302.

Depending on its applications, computing device 300 may include other components that may or may not be physically and electrically coupled to the PCB 302. These other components include, but are not limited to, volatile memory (e.g., dynamic random access memory 307, also referred to as "DRAM"), non-volatile memory (e.g., read only memory 310, also referred to as "ROM"), flash memory 312, an input/output ("I/O") controller 314, a digital signal processor (not shown), a crypto processor (not shown), a graphics processor 316, one or more antenna 318, a display (not shown), a touch screen display 320, a touch screen controller 322, a battery 324, an audio codec (not shown), a video codec (not shown), a global positioning system ("GPS") device 328, a compass 330, an accelerometer (not shown), a gyroscope (not shown), a speaker 332, a camera 334, and a mass storage device (such as hard disk drive, a solid state drive, compact disk ("CD"), digital versatile disk ("DVD")) (not shown), and so forth. In various embodiments, the processor 303 may be integrated on the same die with other components to form a System on Chip ("SoC").

In various embodiments, volatile memory (e.g., DRAM 307), non-volatile memory (e.g., ROM 310), flash memory 312, and the mass storage device may include programming instructions configured to enable computing device 300, in response to execution by processor(s) 303, to practice all or selected aspects of method 200 and other teachings described in the present disclosure. For example, one or more of the memory components such as volatile memory (e.g., DRAM 307), non-volatile memory (e.g., ROM 310), flash memory 312, and the mass storage device may include temporal and/or persistent copies of instructions that, when executed, enable computing device 300 to operate an opportunity logic 304 (which may correspond to opportunity logic 104 of FIG. 1) and/or a delivery system 306 (which may correspond to delivery system 106 of FIG. 1) configured to practice all or selected aspects of method 200.

The communication chips 305 may enable wired and/or wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Each communication chip 305 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 300 may include a plurality of communication chips 305. For instance, a first communication chip 305 may be dedicated to shorter range wireless communications such as Wi-Fi and Bluetooth and a second communication chip 305 may be dedicated to longer range wireless communications such as GPS, EDGE, GPRS, CDMA, WiMAX, LTE, Ev-DO, and others.

In various implementations, the computing device 300 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, a television, or a digital video recorder. In further implementations, the computing device 300 may be any other electronic device that processes data.

Embodiments of apparatus, packages, computer-implemented methods, systems, devices, and computer-readable media (transitory and non-transitory) are described herein for providing a notification of a message to a recipient for consumption using a computing device. In various embodiments, provision of the notification may be in a timing or manner that is based on a characteristic of the message and empirical data about preferred timing or manner of notification of at least another message to the same or different recipient. In various embodiments, the at least another message may share the same characteristic, or may have a related characteristic.

In various embodiments, the timing or manner of provision of the notification may be further based on an operational context of the computing device. In various embodiments, the operational context may include whether the recipient currently operates a vehicle. In various embodiments, the operational context may include media content consumed using the computing device. In various embodiments, the timing or manner of provision of the notification may be based on whether content of the message has a higher priority to the recipient than the media content. In various embodiments, the timing of provision of the notification may be immediately or at a later time based on a determination that the message is related to the media content or is not related to the media content, respectively.

In various embodiments, the computing device may be configured to update the empirical data to include a timing or manner in which the notification of the message to the recipient is consumed. In various embodiments, the characteristic of the message may be a source of the message, a relationship between a sender and the recipient, a content of the message, and so forth. In various embodiments, the characteristic of the message may be a non-deterministic hint as to the timing or manner in which notification of the message should be provided for consumption using the computing device. In various embodiments, the non-deterministic hint may include an indication of a format in which notification of the message should be provided to the recipient for consumption using the computing device.

In various embodiments, the timing of provision of the notification may be defined relative to a timing of provision of notification of at least another message to the recipient for consumption using the computing device.

In various embodiments, the timing of provision of the notification may be on occurrence of a future event. In various embodiments, the future event may be a determination that the computing device has stopped moving. In various embodiments, the future event may be a commercial interruption.

In various embodiments, provision of the notification may be in a manner that requires interaction from the recipient. In various embodiments, another notification of another message remains provided until after the recipient interacts with the notification, or the another notification is provided again after the recipient interacts with the notification. Any embodiment of an apparatus, package, computer-implemented method, system, device, and/or computer-readable media may include any combination of these features.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium comprising instructions that, in response to execution of the instructions by a first computing device, cause the first computing device to:
   determine a subject matter of a message to a user of a second computing device based on analysis of content of the message;
   determine that the user is currently using the second computing device to consume a particular media content;
   determine a subject matter of the particular media content;
   determine whether the subject matter of the message overlaps with the subject matter of the media content;
   in response to determining whether the subject matter of the message overlaps with the subject matter of the media content, cause the provision of a notification of the message to the user for consumption using the second computing device, wherein provision of the notification is in a timing or manner that is based on:
   at least one characteristic of the message, wherein the at least one characteristic of the message comprises the subject matter of the message; and data about preferred timing or manner of notification of messages having the same characteristic or a related characteristic, wherein the data includes a rule that specifies that notification of a message whose subject matter does not overlap with the subject matter of currently consumed media content is to be delayed at the second computing device and that notification of the message is to be provided at a third computing device, different from the second computing device, for consumption.

2. The at least one non-transitory computer-readable medium of claim 1, wherein the timing or manner of provision of the notification is further based on whether content of the message has a higher priority to the user than the media content.

3. The at least one non-transitory computer-readable medium of claim 1, wherein the instructions, in response to execution by the first computing device, further cause the first computing device to update the empirical data to include a timing or manner in which the notification of the message to the recipient is consumed.

4. The at least one non-transitory computer-readable medium of claim 1, wherein the at least one characteristic of the message includes a source of the message, and wherein the timing or manner of provision of the notification is further based on the source of the message.

5. The at least one non-transitory computer-readable medium of claim 1, wherein the at least one characteristic of the message includes a relationship between a sender and the user, and wherein the timing or manner of provision of the notification is further based on the relationship between the sender and the user.

6. The at least one non-transitory computer-readable medium of claim 1, wherein the timing of provision of the notification is defined relative to a timing of provision of notification of at least another message to the recipient for consumption using the computing device.

7. The at least one non-transitory computer-readable medium of claim 1, wherein the timing of provision of the notification is on occurrence of a future event.

8. The at least one non-transitory computer-readable medium of claim 7, wherein the future event is a commercial interruption.

9. The at least one non-transitory computer-readable medium of claim 1, wherein the at least one characteristic of the message includes a non-deterministic hint as to the timing or manner in which notification of the message should be provided for consumption using the first computing device, or includes an indication of a format in which notification of the message should be provided to the recipient for consumption using the computing device.

10. The at least one non-transitory computer-readable medium of claim 1, wherein provision of the notification is in a manner that requires interaction from the user to access the content of the message.

11. The at least one non-transitory computer-readable medium of claim 10, wherein another notification of another message remains provided until after the recipient interacts with the notification, or the another notification is provided again after the recipient interacts with the notification.

12. The at least one non-transitory computer-readable medium of claim 1, wherein the rule that specifies that notification of a message whose subject matter does not overlap with the subject matter of currently consumed media content is to be delayed comprises a rule that specifies that visual notification of a message whose subject matter does not overlap with the subject matter of currently consumed media content is to be delayed.

13. The at least one non-transitory computer-readable medium of claim 1, wherein no indication of the message is provided to the user prior to provision of the notification.

14. The at least one non-transitory computer-readable medium of claim 1, wherein the instructions, in response to execution by the first computing device, further cause the first computing device to determine that the third computing device is proximate to the second computing device, prior to causing the provision of the notification of the message to the user.

15. The at least one non-transitory computer-readable medium of claim 1, wherein the first computing device is a same computing device as the second computing device.

16. A computer-implemented method, comprising:
receiving or generating, by a first computing device, a message to a user of a second computing device;
analyzing, by the first computing device, (i) at least one characteristic of the message, (ii) an operational context of the second computing device, and (iii) data about preferred timing or manner of notification of messages having the same characteristic or a related characteristic, wherein:
analyzing at least one characteristic of the message includes determining a subject matter of the message based on analysis of content of the message,
analyzing the operational content of the second computing device comprises determining that the user is currently using the second computing device to consume a particular media content, determining a subject matter of the media content, and determining whether the subject matter of the message overlaps with the subject matter of the media content, and
the data about preferred timing or manner or notification includes a rule that specifies that notification of a message whose subject matter does not overlap with the subject matter of the currently consumed media content is to be delayed at the second computing device and that notification of the message is to be provided at a third computing device, different from the second computing device, for consumption; and
causing the provision, by the first computing device, a notification of the message to a recipient for consumption using the second computing device in a timing or manner that is based on a result of the analyzing and in accordance with the rule.

17. The computer-implemented method of claim 16, further comprising providing the notification in a manner that requires interaction from the user to access the content of the message.

18. The computer-implemented method of claim 16, wherein no indication of the message is provided to the user prior to providing the notification.

19. The computer-implemented method of claim 16, further comprising determining that the third computing device is proximate to the second computing device, prior to causing the provision of the notification of the message to the user.

20. The computer-implemented method of claim 16, wherein the first computing device is a same computing device as the second computing device.

21. A system, comprising:
one or more processors;
a memory coupled with the one or more processors;
an opportunity logic to be operated by the one or more processors to analyze:

a characteristic of a message to a user of the system, analyze the characteristic of the message includes determine a subject matter of the message based on analysis of the content of the message;

an operational context of the system, wherein analyze the operational context of the system comprises determine that the user is currently using a computing device to consume a particular media content, determine a subject matter of the particular media content, and determine whether the subject matter of the message overlaps with the subject matter of the media content; and data about preferred timing or manner of notification of messages having the same characteristic or a related characteristic, wherein the data includes a rule that specifies that notification of a message whose subject matter does not overlap with subject matter of currently consumed media content is to be delayed; and a delivery system to be operated by the one or more processors to provide a notification of the message to the recipient for consumption using the system in a timing or manner that is based at least in part on a result of the analysis by the opportunity logic and in accordance with the rule that specifies that notification of a message whose subject matter does not overlap with the subject matter of the currently consumed media content is to be delayed at the computing device and that notification of the message is to be provided at a second computing device, different from the computing device, for consumption.

22. The system of claim 21, wherein provision of the notification is in a manner that requires interaction from the user to access the content of the message.

23. The system of claim 21, wherein no indication of the message is provided to the user prior to provision of the notification.

24. The system of claim 21, wherein the opportunity logic is further to determine that the third computing device is proximate to the second computing device, prior to causing the provision of the notification of the message to the user.

25. The system of claim 21, wherein the opportunity logic is included in the computing device.

* * * * *